United States Patent
Kawakami

(10) Patent No.: US 8,978,511 B2
(45) Date of Patent: Mar. 17, 2015

(54) POSITION CONTROL MECHANISM

(75) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 825 days.

(21) Appl. No.: 12/942,331

(22) Filed: Nov. 9, 2010

(65) Prior Publication Data

US 2012/0111136 A1 May 10, 2012

(51) Int. Cl.
*F16C 1/10* (2006.01)
*G05G 1/08* (2006.01)
*B62K 25/02* (2006.01)
*B62K 23/06* (2006.01)
*B62M 25/04* (2006.01)

(52) U.S. Cl.
CPC ............... *B62K 23/06* (2013.01); *B62M 25/04* (2013.01)
USPC ........................................... 74/502.2; 74/489

(58) Field of Classification Search
CPC .............................. B62K 23/06; B62M 25/04
USPC ........................... 74/502.2, 488, 489, 473.13
See application file for complete search history.

(56) References Cited

U.S. PATENT DOCUMENTS

| 5,921,139 | A  | * | 7/1999  | Yamane .................... 74/473.13 |
| 6,494,662 | B1 | * | 12/2002 | De Montalembert ............ 414/1 |
| 6,729,203 | B2 | * | 5/2004  | Wesling et al. ............. 74/502.2 |
| 7,305,903 | B2 | * | 12/2007 | Kawakami ................... 74/502.2 |
| 7,340,975 | B2 |   | 3/2008  | Kawakami |
| 8,096,208 | B2 | * | 1/2012  | Sean .......................... 74/502.2 |
| 2006/0130602 | A1 | * | 6/2006  | Kawakami ................ 74/473.14 |
| 2006/0260428 | A1 | * | 11/2006 | Kawakami et al. .......... 74/502.2 |
| 2007/0221008 | A1 | * | 9/2007  | Shipman et al. ............. 74/502.2 |
| 2007/0261508 | A1 | * | 11/2007 | Acenbrak .................... 74/502.2 |
| 2008/0276748 | A1 | * | 11/2008 | Chen ........................... 74/502.2 |
| 2010/0282015 | A1 | * | 11/2010 | Lude ............................. 74/491 |

* cited by examiner

*Primary Examiner* — Vinh Luong
(74) *Attorney, Agent, or Firm* — Global IP Counselors

(57) ABSTRACT

A position control mechanism is provided for a bicycle control device that basically has a fixed member, a first positioning member and a second positioning member and an operating member. The fixed member includes a first tooth and a second tooth. The first positioning member includes a first positioning tooth selectively contacting the first tooth to prevent the first positioning member from moving in a first direction. The second positioning member includes a second positioning tooth selectively contacting the second tooth to prevent the second positioning member from moving in the first direction. The operating member is arranged relative to the first and second positioning members such that the first and second positioning members move relative to the fixed member and the first and second positioning teeth contact the first and second teeth alternately as the operating member is moved in the first direction.

14 Claims, 13 Drawing Sheets

US 8,978,511 B2

POSITION CONTROL MECHANISM

BACKGROUND

1. Field of the Invention

This invention generally relates to a position control mechanism. More specifically, the present invention relates to a position control mechanism that is used for controlling the indexing of a bicycle control device.

2. Background Information

Many bicycles have bicycle components that are moved between various positions. For example, a gear shift operating device (bicycle shifter) is one example of a bicycle control device that is moved between various positions. In this type of bicycle control device (i.e., a gear shift operating device), a position control mechanism is often provided for controlling a gear changing device between a plurality of positions that corresponds to gear positions of the gear changing device. The gear shift operating device is connected to the gear changing device with, for example, a Bowden-type gear shift cable. The gear shift operating device is configured and arranged to allow a user to operate the gear changing device by operating, for example, a lever or other such operating member. A conventional gear shift operating device has an operating member, a support member serving to support the operating member and a mounting member. The mounting member is often integrally formed with the support member, and configured to be fastened to a portion of the bicycle. Typically, the gear shift operating device is attached to a portion of a handlebar of a bicycle. One example of a bicycle control device (bicycle shifter) is disclosed in U.S. Pat. No. 7,340,975. In this patent, the bicycle control device has an indexing mechanism with a cam arrangement for providing distinct positions.

SUMMARY

The present invention is directed to various features of a position control mechanism for a bicycle control device. In its broadest terms, the position control mechanism can be used with bicycle components other than the control device illustrated herein.

In accordance with one aspect of this disclosure, a position control mechanism is provided for a bicycle control device that basically comprises a fixed member, a first positioning member, a second positioning member and an operating member. The fixed member includes a first tooth and a second tooth. The first positioning member includes a first positioning tooth selectively contacting the first tooth to prevent the first positioning member from moving in a first direction. The second positioning member includes a second positioning tooth selectively contacting the second tooth to prevent the second positioning member from moving in the first direction. The second positioning member is movably arranged relative to the first positioning member. The operating member is movably arranged relative to the fixed member to move in the first direction. The operating member is arranged relative to the first and second positioning members such that the first and second positioning members move relative to the fixed member and the first and second positioning teeth contact the first and second teeth alternately as the operating member is moved in the first direction.

Additional inventive features will become apparent from the description below, and such features alone or in combination with the above features may form the basis for further inventions as recited in the claims and their equivalents.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
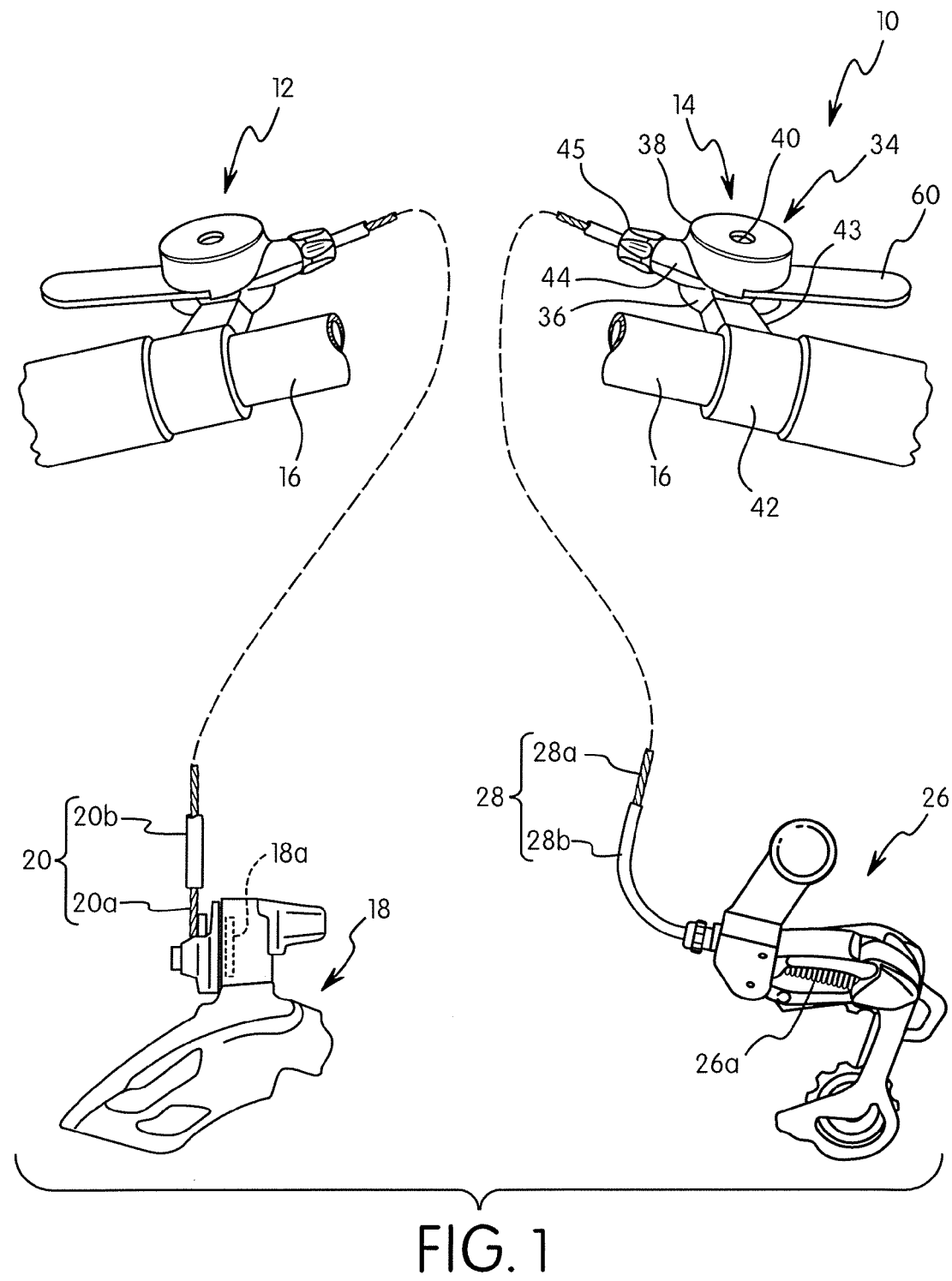
FIG. 1 is a side elevational view of a bicycle shifting system that is equipped with a pair of bicycle shift control devices which each has a position control mechanism in accordance with one embodiment.

Referring initially to FIG. 1, a bicycle shifting system 10 with a pair (left and right) of shift control devices 12 and 14 is illustrated in accordance with a first embodiment. The left and right shift control devices 12 and 14 are attached to a handlebar 16 of bicycle (not shown). The bicycle shifting system 10 further includes a front derailleur 18 operatively coupled to the left shift control device 12 by a shift control cable 20. The left shift control device 12 operates a front derailleur 18 via the shift control cable 20 for switching a chain (not shown) among a plurality of front sprockets (not shown). The bicycle shifting system 10 further includes a rear derailleur 26 operatively coupled to the right shift control device 14 by a shift control cable 28. The right shift control device 14 operates the rear derailleur 26 via the shift control cable 28 for switching the chain among a plurality of rear sprockets (not shown).

Preferably, the shift control cables 20 and 28 are conventional Bowden cables that have an outer case that covers an inner wire. For example, in the case of the left shift control device 12, the shift control cable 20 has an inner wire 20a and an outer case 20b. In the case of the right shift control device 14, the shift control cable 28 has an inner wire 28a and an outer case 28b. During normal use, the front derailleur 18 has a spring or biasing element 18a that places the inner wire 20a under tension, while the rear derailleur 26 has a spring or biasing element 26a that places the inner wire 28a under tension.

The left shift control device 12 is mounted on the left side of the handlebar 16, while the right shift control device 14 is mounted on the right side of the handlebar 16. The left and right shift control devices 12 and 14 are substantially in identical in construction and operation, except that they are mirror images and modified for accommodating a different number of gear positions. Thus, for the sake of brevity, only the right shift control device 12 will be described and illustrated in detail herein. Moreover, while the front and rear derailleurs 18 and 26 are operated by the left and right shift control devices 12 and 14, respectively, the left and right shift control devices 12 and 14 could be reconfigured so that the front derailleur 18 is operated by a right shift control device and the rear derailleur 26 is operated by a left shift control device, as needed and/or desired.

Figure 2:
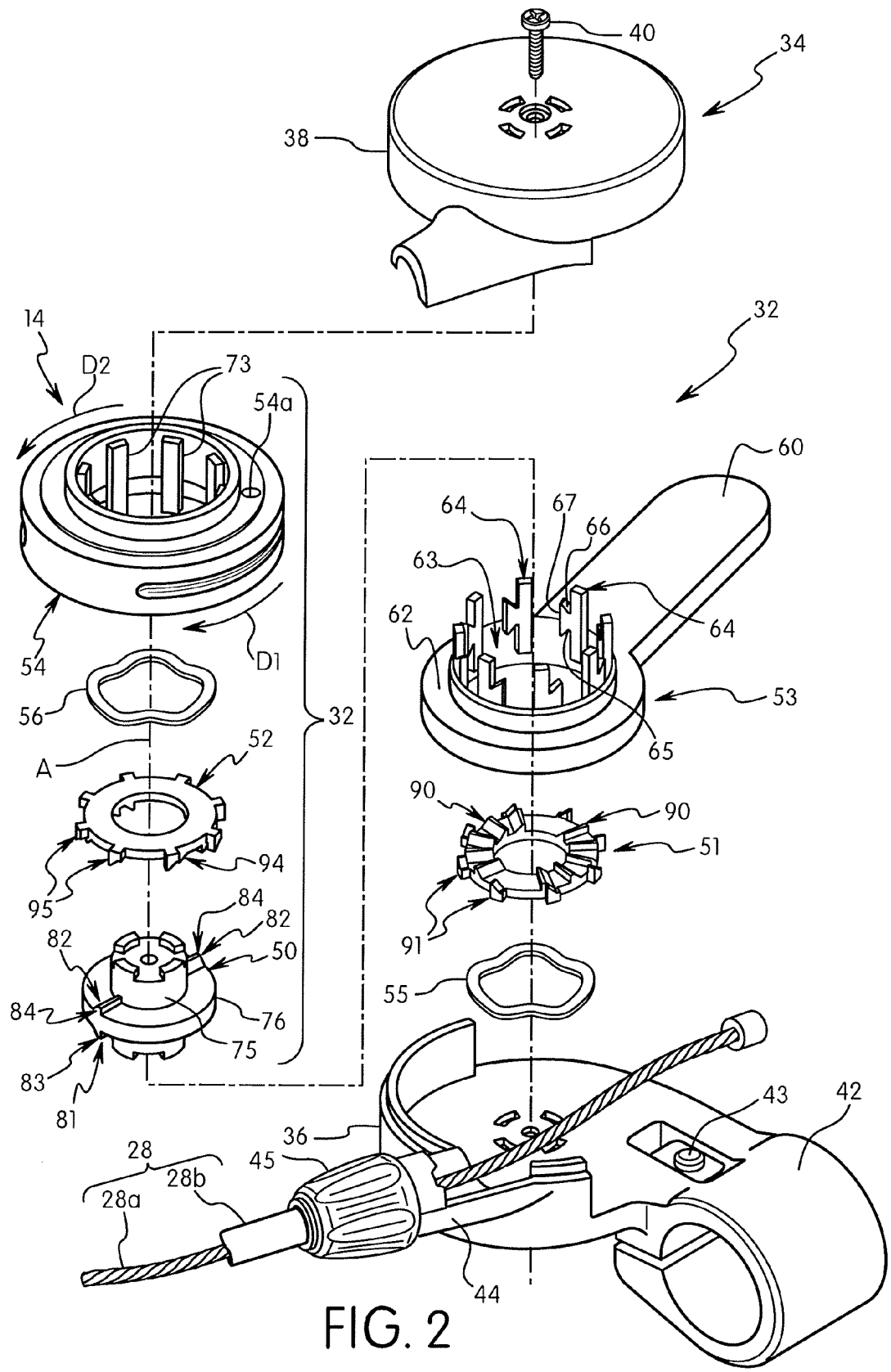
FIG. 2 is an exploded perspective view of the right side one of the shift control devices illustrated in FIG. 1.
Figure 3:
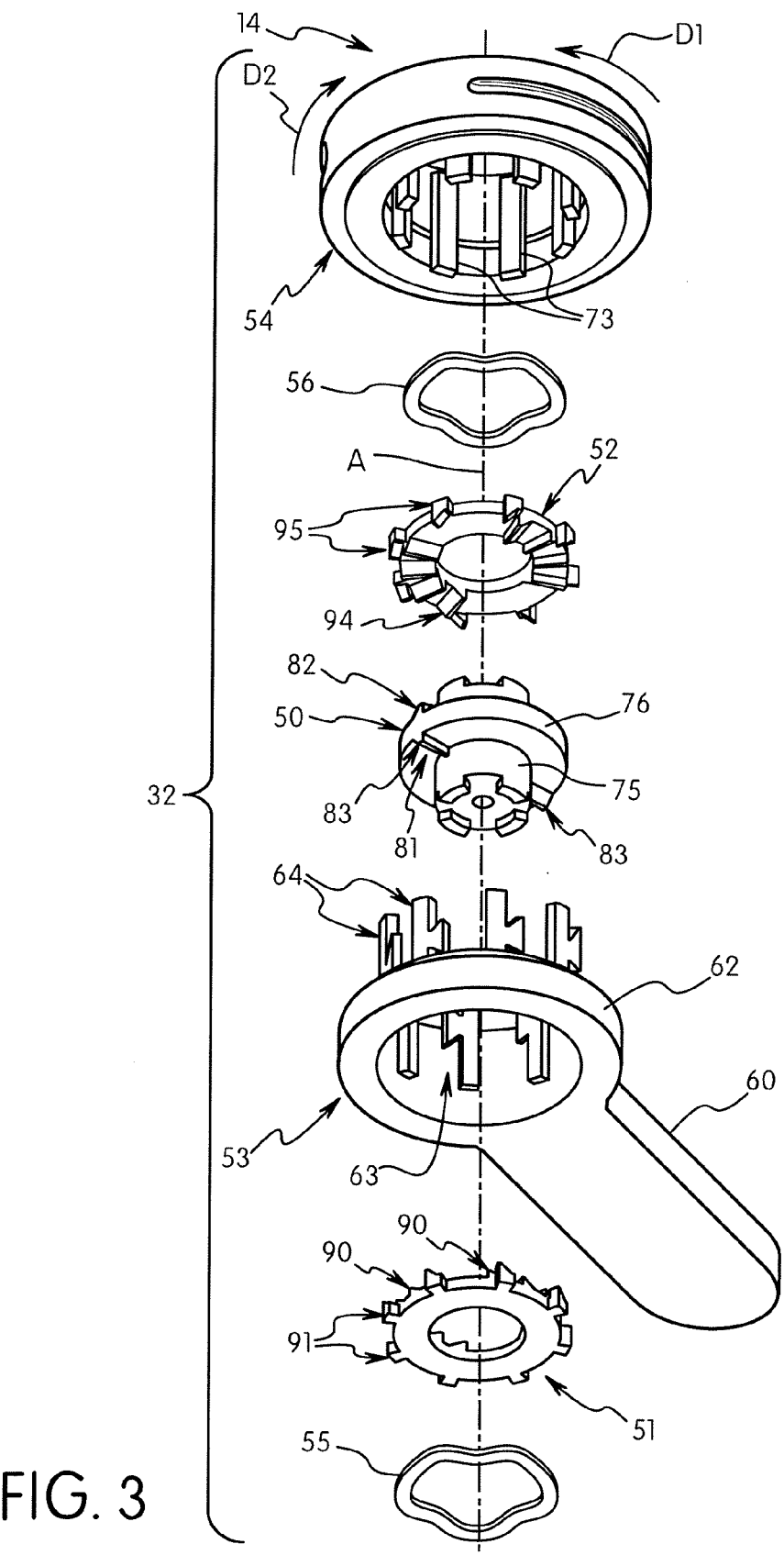
FIG. 3 is another exploded perspective view of the right side one of the shift control devices illustrated in FIGS. 1 and 2.

As seen in FIGS. 2 and 3, the right shift control device 14 is equipped with a position control mechanism 32 in accordance with one illustrated embodiment. In the illustrated embodiment, the position control mechanism 32 is contained in a housing 34 having a lower or first casing 36 and an upper or second casing 38. A threaded fastener 40 (e.g., screw) is used for releasably securing the lower and upper casings 36 and 38 together in a conventional manner. In the illustrated embodiment, the position control mechanism 32 is configured for shifting between six gear positions. In the case of the position control mechanism (not shown) of the left shift control device 12, the position control mechanism is configured for shifting between three gear positions. However, the position control mechanism 32 could be used with other types of bicycle control devices as needed and/or desired.

The lower casing 36 includes a tubular clamping band 42 with a screw 43 for fixedly attaching the housing 34 to the handlebar 16 in a conventional manner. The lower casing 36 further includes a cable guide 44 that guides the inner wire 28a of the control cable 28. A conventional cable adjusting barrel 45 screws onto the end of cable guide 44. The cable adjusting barrel 45 includes a cable passage for the receiving the inner wire 28a therethrough and an outer casing stop for terminating an outer casing 28b of the control cable 28 in a conventional manner.

As best seen in FIGS. 2 and 3, the position control mechanism 32 basically includes a fixed member 50, a first positioning member 51 and a second positioning member 52 and an operating member 53. Since the position control mechanism 32 is utilized in a shifter (e.g., right shift control device 14), the position control mechanism 32 further includes a wire takeup member 54 for pulling and releasing the inner wire 28a of the control cable 28 to operate the rear derailleur 26 in a conventional manner. In this illustrated embodiment, the position control mechanism 32 provides six distinct shift positions that correspond to six distinct gear positions of the rear derailleur 26. As explained below, an unwinding or releasing operation of the inner wire 28a of the control cable 28 is performed by rotating the operating member 53 in a first direction D1 relative to the fixed member 50 around an operating or rotational axis A. On the other hand, a winding or pulling operation of the inner wire 28a of the control cable 28a is performed by rotating the operating member 53 in a second direction D2 relative to the fixed member 50 around the rotational axis A. In this illustrated embodiment, the first and second directions D1 and D2 are rotational directions with respect to the rotational axis A. However, the position control mechanism 32 can be constructed to move in a substantially linear path as needed and/or desired.

Also in this illustrated embodiment, a first biasing element 55 is disposed between the lower casing 36 and the first positioning member 51. The first biasing element 55 is configured and arranged to bias the first positioning member 51 in an axial direction along the rotational axis A towards the fixed member 50. The second positioning member 52 is biased in an axial direction along the rotational axis A towards the fixed member 50 by a second biasing element 56. The second biasing element 56 is disposed between the upper casing 38 and the positioning member 52. Thus, the first and second positioning members 51 and 52 are biased towards each other and into direct contact with the fixed member 50 by the first and second biasing elements 55 and 56. In this illustrated embodiment, the first and second biasing elements 55 and 56 are metal wave springs that are axially compressible. Of course, other types of biasing elements can be used instead of metal wave springs, such as coil compression springs, as needed and/or desired.

In this illustrated embodiment, as seen in FIGS. 2 and 3, the fixed member 50 defines the operating or rotational axis A of the position control mechanism 32. The fixed member 50 is non-rotatably fixed to the lower and upper casings 36 and 38 such that the fixed member 50 is a stationary member during operation of the right shift control device 14. The first and second positioning members 51 and 52, the operating member 53 and the wire takeup member 54 are all mounted on the fixed member 50 for selective movement around the rotational axis A.

In general, the position control mechanism 32 is operated by a user (e.g., a rider) by moving the operating member 53 with respect to the fixed member 50 in either the first or second directions D1 or D2. In other words, the user can change the position of the wire takeup member 54 relative to the fixed member 50 by moving the operating member 53. By changing the rotational position of the operating member 53 with respect to the fixed member 50, the inner wire 28a of the control cable 28 is either pulled or released for operate the rear derailleur 26 in a conventional manner. In this illustrated embodiment, the operating member 53 and the first and second positioning members 51 and 52 rotate in the first direction D1 relative to the fixed member 50 around the rotational axis A to perform an unwinding or releasing operation of the inner wire 28a of the control cable 28. Thus, the first direction D1 constitutes a wire releasing direction. The operating member 53 and the first and second positioning members 51 and 52 rotate in the second direction D2 relative to the fixed member 50 around the rotational axis A to perform a winding or pulling operation of the inner wire 28a of the control cable 28. Thus, the second direction D2 constitutes a wire pulling direction.

As explained below, as the operating member 53 is moved along the first movement path in either the first or second directions D1 or D2, each of the first and second positioning members 51 and 52 moves relative to the fixed member 50 to a next relative shift position along the first movement path. Also as explained below, at least one of the first and second positioning members 51 and 52 moves relative to the fixed member 50 moves along a second movement path as the operating member 53 is moved along the first movement path in either the first or second directions D1 or D2. The second movement path (e.g., an axial movement path in the illustrated embodiment) is transverse to the first movement path (e.g., a rotational movement path in the illustrated embodiment).

Figure 4:
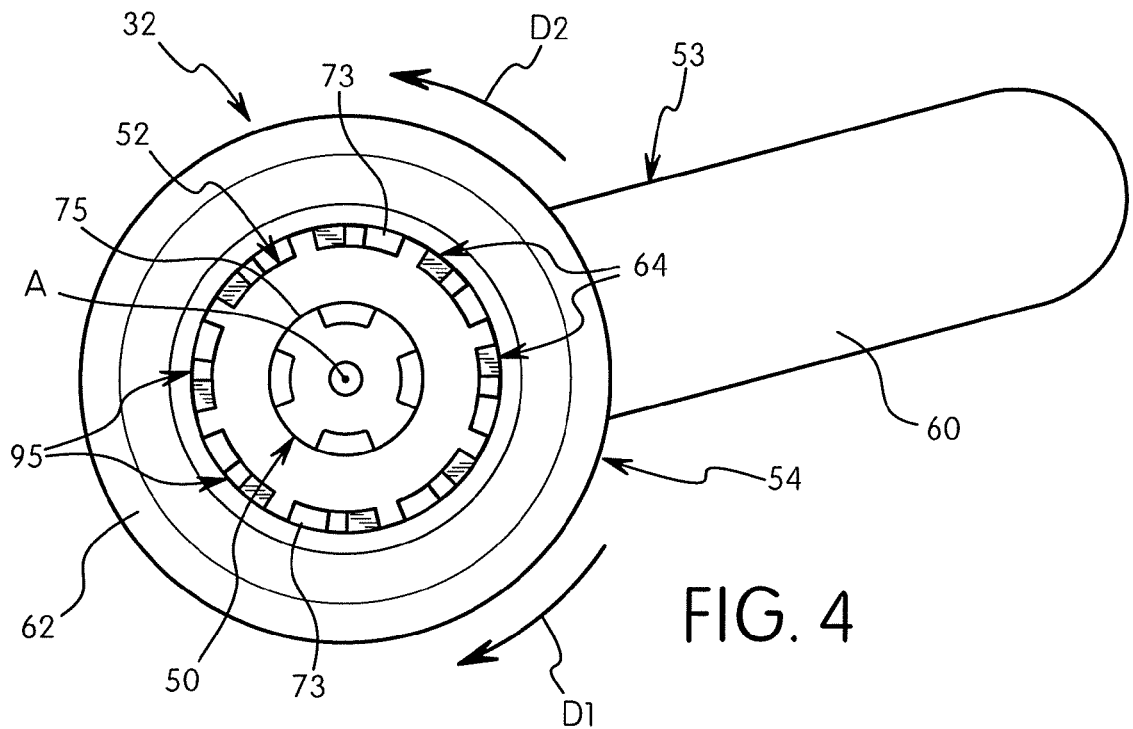
FIG. 4 is a top plan view of the position control mechanism illustrated in FIGS. 2 and 3.
Figure 5:
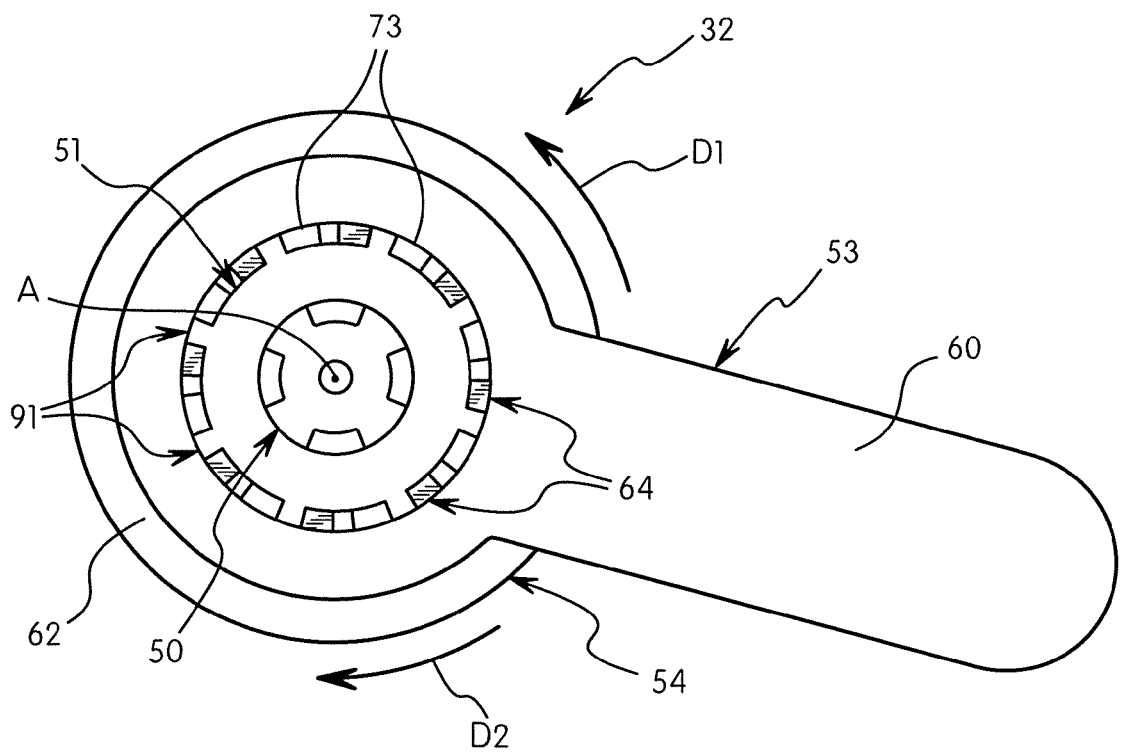
FIG. 5 is a bottom plan view of the position control mechanism illustrated in FIGS. 2 to 4.
Figure 6:
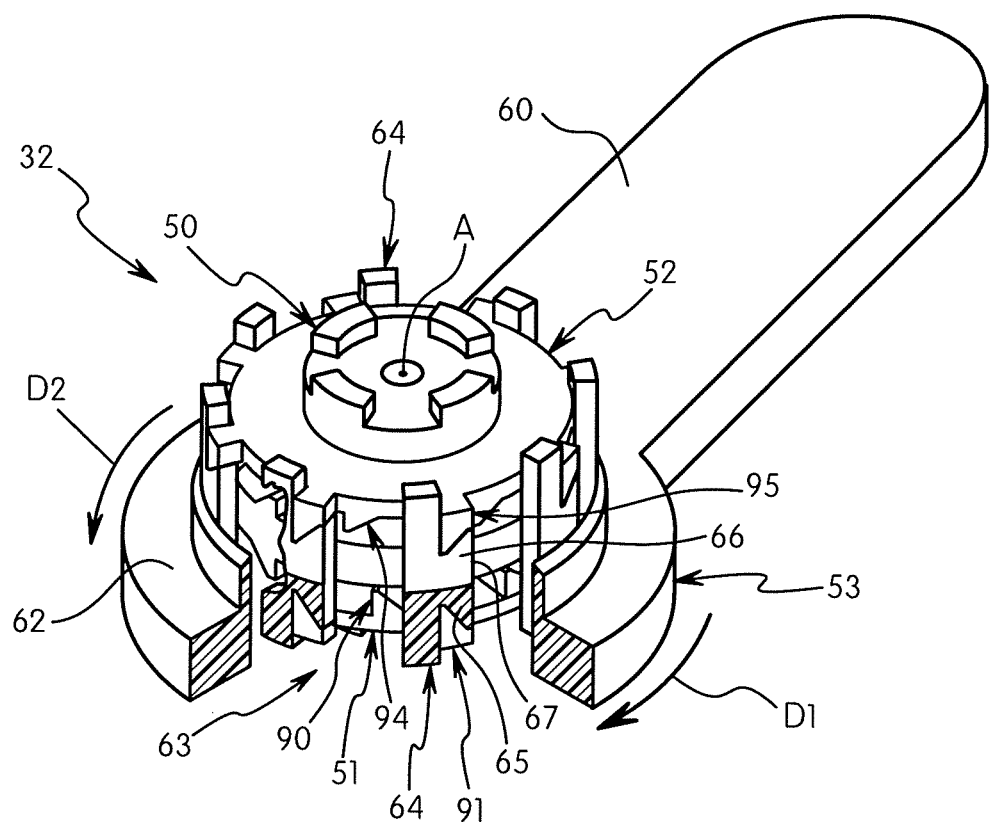
FIG. 6 is a perspective view of the position control mechanism illustrated in FIGS. 2 to 5, with a portion of the operating lever broken away.
Figure 7:
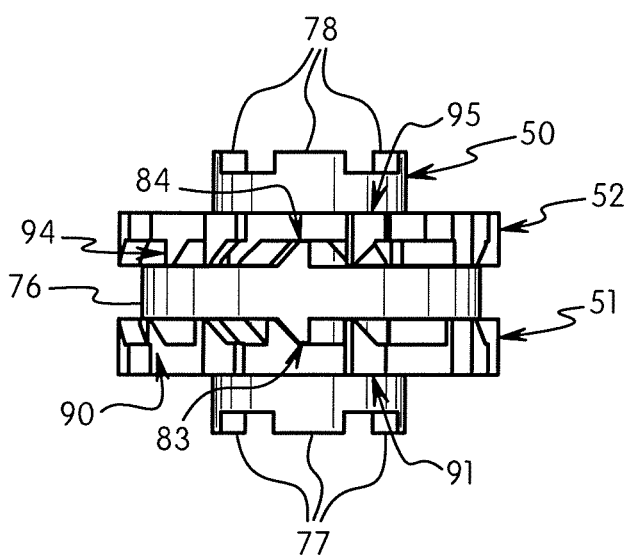
FIG. 7 is a side elevational view of selected parts of the position control mechanism illustrated in FIGS. 2 to 6.

Turning now to FIGS. 4 to 7, the assembled arrangement of the fixed member 50, the first and second positioning members 51 and 52, the operating member 53 and the wire takeup member 54 are illustrated in more detail. As seen in FIGS. 4 and 5, the members 50 to 54 are all concentrically arranged around the rotational axis A. In particular, as seen in FIGS. 4 and 5, the wire takeup member 54 is also mounted on the operating member 53 to rotate on the fixed member 50 about the operating axis A. The wire takeup member 54 is operatively coupled to the first and second positioning members 51 and 52 via the operating member 53. In this way, rotation of the operating member 53 changes a rotational position of the wire takeup member 54 with respect to the fixed member 50 as the first and second positioning members 51 and 52 rotate on the fixed member 50. As seen in FIGS. 6 and 7, the first and second positioning members 51 and 52 are directly mounted on the fixed member 50 to rotate on the fixed member 50 about the rotational axis A. In other words, each of the first and second positioning members 51 and 52 has a center of rotation that corresponds to the rotational axis A. As seen in FIG. 6, the operating member 53 is also mounted on the fixed member 50 to rotate on the fixed member 50 about the rotational axis A via the first and second positioning members 51 and 52. Thus, the operating member 53 is operatively coupled to the first and second positioning members 51 and 52 for changing a rotational position of the first and second positioning members 51 and 52 with respect to the fixed member 50.

Turning now to the operating member 53, as seen in FIGS. 2 and 6, the operating member 53 basically includes a user operating portion 60 and a mounting portion 62. The operating member 53 is preferably formed integrally as a one-piece unitary member. Moreover, the operating member 53 is preferably constructed of a lightweight rigid material such as hard plastic or lightweight metal. Of course, it will be apparent from this disclosure that the operating member 53 can be made of several pieces as needed and/or desired.

As seen in FIG. 1, the user operating portion 60 of the operating member 53 protrudes out of an opening in the housing 34 so that a user or rider can operate the position control mechanism 32 by moving the user operating portion 60 in either the first direction D1 (releasing operation) or the second direction D2 (pulling operation). Thus, the operating member 53 is movably arranged relative to the fixed member 50 to move in the first and second direction D1 along a first movement path, which is a curved path in the illustrated embodiment. Axial movement of the operating member 53 is substantially prevented by the housing 34.

The mounting portion 62 of the operating member 53 is disposed on the fixed member 50 within the housing 34 so that the operating member 53 selectively rotates on about the rotational axis A. Movement of the user operating portion 60 in either the first direction D1 (releasing operation) or the second direction D2 (pulling operation) causes the mounting portion 62 to change the first and second positioning members 51 and 52 with respect to the fixed member 50 for maintaining the wire takeup member 54 in a new shift position.

As seen in FIGS. 2 to 6, the mounting portion 62 of the operating member 53 is a ring shaped member that has a mounting aperture 63. The surface of the mounting portion 62 that defines the mounting aperture 63 that is provided with a plurality of operating cams 64. These operating cams 64 are configured and arranged to engage the first and second positioning members 51 and 52 for selectively indexing the first and second positioning members 51 and 52 relative to the fixed member 50. In other words, rotation of the operating member 53 causes the operating cams 64 to contact the first and second positioning members 51 and 52. This contact of the operating cams 64 against the first and second positioning members 51 and 52 causes at least one of the first and second positioning members 51 and 52 to move axially in a direction of the rotational axis A such that both of the first and second positioning members 51 and 52 can rotate on the fixed member 50.

In the illustrated embodiment, each of the operating cams 64 includes a first operating cam portion 65 and a second operating cam portion 66. The first operating cam portions 65 operatively engage the first positioning member 51, while the second operating cam portions 65 operatively engage the second positioning member 52. Also, each of the operating cams 64 includes a contact surface 67 that contacts the wire takeup member 54. The wire takeup member 54 is biased in the first direction D1 such that the wire takeup member 54 contacts the contact surfaces 67 of the operating cams 64 by the biasing element 26a of the rear derailleur 26. In particular, the inner wire 28a is connected at one end to the rear derailleur 26 and at the other end to the wire takeup member 54. The rear derailleur 26 is mounted to the bicycle such that the biasing element 26a of the rear derailleur 26 places the inner wire 28a under tension, which then biases the wire takeup member 54 in the first direction D1.

Figure 8:
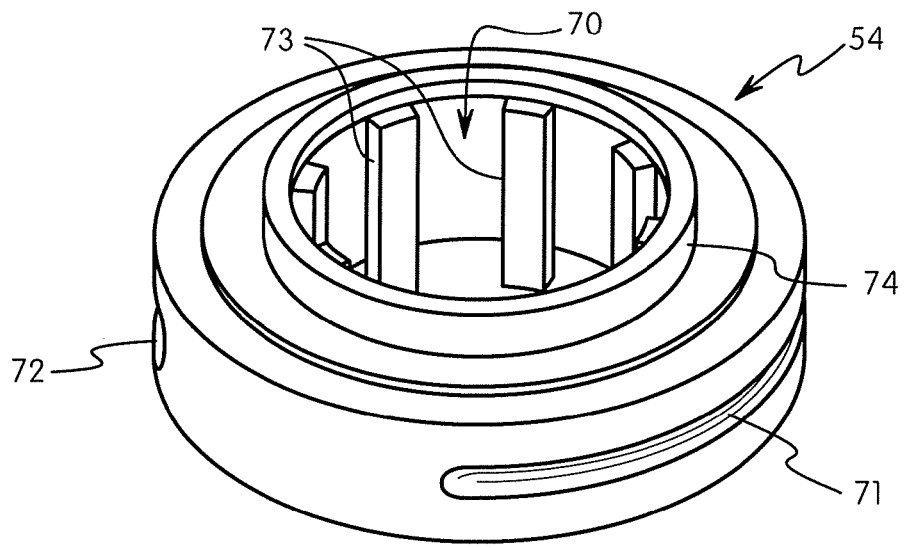
FIG. 8 is a perspective view of the wire takeup member of the position control mechanism illustrated in FIGS. 2 to 6.
Figure 9:
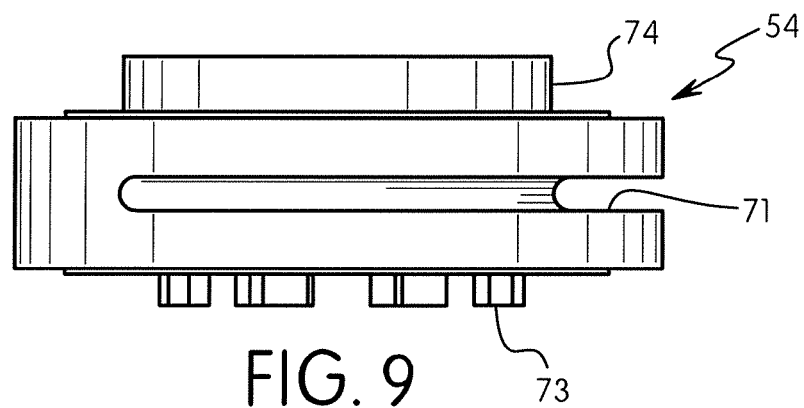
FIG. 9 is a first side elevational view of the wire takeup member illustrated in FIG. 8 for the position control mechanism illustrated in FIGS. 2 to 6.
Figure 10:
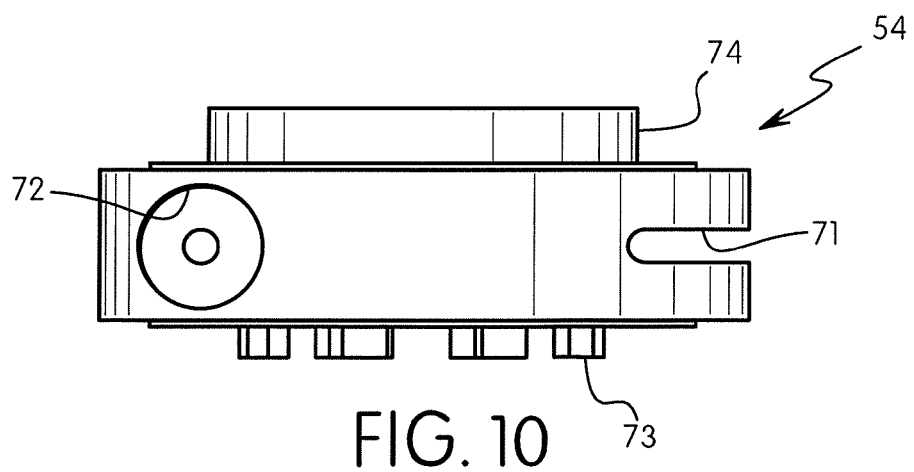
FIG. 10 is a second side elevational view of the wire takeup member illustrated in FIGS. 8 and 9 for the position control mechanism illustrated in FIGS. 2 to 6.

Referring now to FIGS. 8 to 10, the wire takeup member 54 is a ring shaped member that is disposed on the fixed member 50 in a rotatable manner in the first and second directions D1 and D2. In other words, the wire takeup member 54 is movably arranged relative to the fixed member 50 to move in the first and second directions D1 and D2 in response to movement the operating member 53 in the first and second directions D1 and D2, respectively. As mentioned above, the wire takeup member 54 is biased toward the first direction D1. The wire takeup member 54 is preferably formed integrally as a one-piece unitary member. Moreover, the wire takeup member 54 is preferably constructed of a lightweight rigid material such as hard plastic or lightweight metal. Of course, it will be apparent from this disclosure that the operating member 53 can be made of several pieces as needed and/or desired.

The wire takeup member 54 basically has a central bore 70 with an outer peripheral surface having an inner wire receiving groove 71 and an inner wire nipple receiving recess 72. The central bore 70 receives the fixed member 50 and the first and second positioning members 51 and 52 therein for rotatably supporting the wire takeup member 54 on the fixed member 50. As discussed below, the first and second positioning members 51 and 52 cooperate with the fixed member 50 to selectively index the rotational position of the wire takeup member 54 on the fixed member 50. Also the central bore 70 has a plurality of axially extending splines 73 for selectively contacting the operating cams 64 of the operating member 53 and portions of the first and second positioning members 51 and 52 as discussed below. When the position control mechanism 32 is in a rest position (i.e., not being operated), the axially extending splines 73 of the wire takeup member 54 are contacting the operating cams 64 of the operating member 53. The axially extending splines 73 of the wire takeup member 54 are biased against the contact surface 67 of the operating cams 64 of the operating member 53 due to the biasing force applied to the wire takeup member 54 by the biasing element 26a of the rear derailleur 26 via the inner wire 28a. The axially extending splines 73 of the wire takeup member 54 also extends outside of the central bore 70 such that the axially extending splines 73 contact the surface of the mounting aperture 63 of the operating member 53. The upper face of the wire takeup member 54 has a cylindrical extending portion 74 that is received in a groove (not shown) of the upper casing 38 to allow for relative rotational movement of the wire takeup member 54 relative to the upper casing 38.

Figure 11:
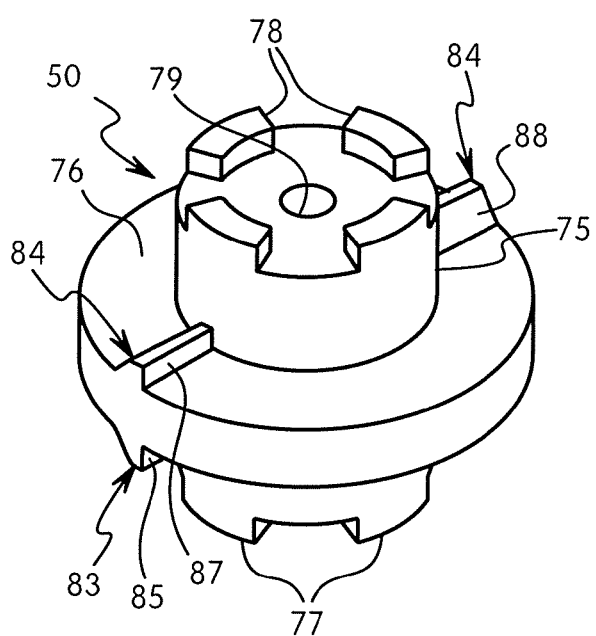
FIG. 11 is a perspective view of the fixed member of the position control mechanism illustrated in FIGS. 2 to 6.
Figure 12:
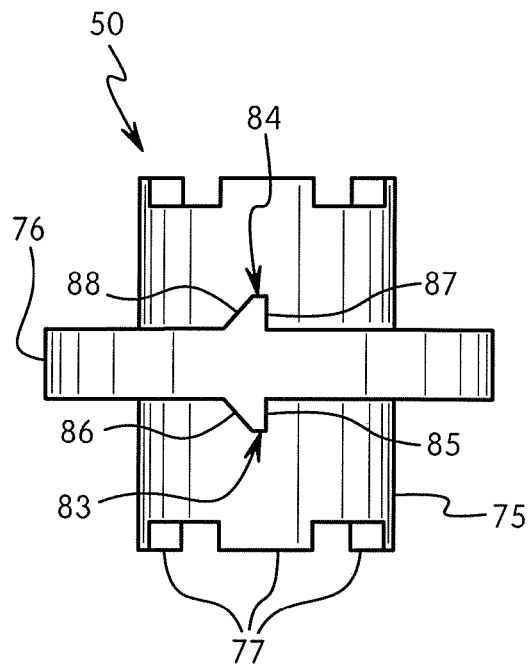
FIG. 12 is a first side elevational view of the fixed member illustrated in FIG. 11 for the position control mechanism illustrated in FIGS. 2 to 6.
Figure 13:
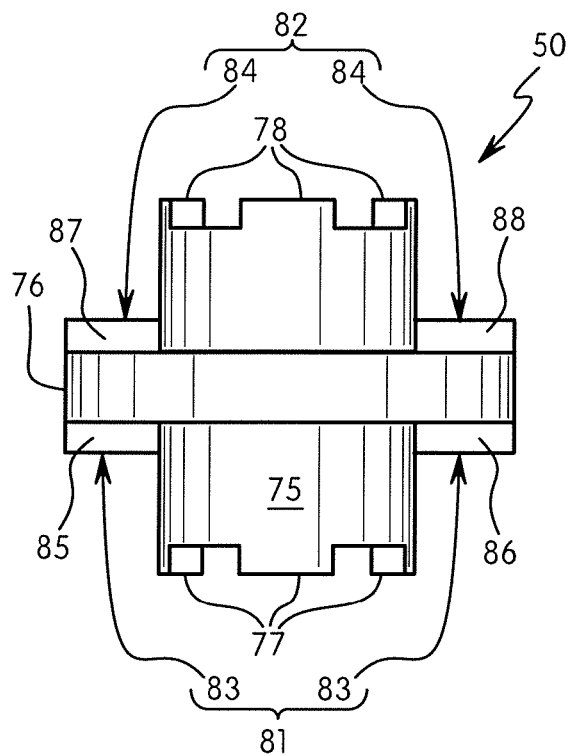
FIG. 13 is a second side elevational view of the fixed member illustrated in FIGS. 11 and 12 for the position control mechanism illustrated in FIGS. 2 to 6.
Figure 14:
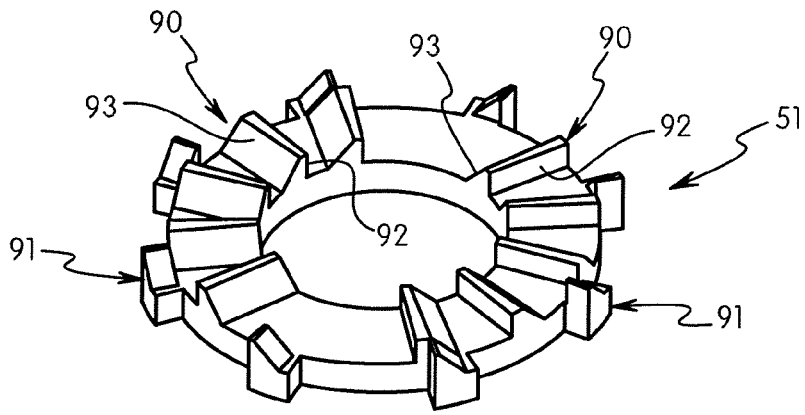
FIG. 14 is a perspective view of the first positioning member of the position control mechanism illustrated in FIGS. 2 to 6.
Figure 15:
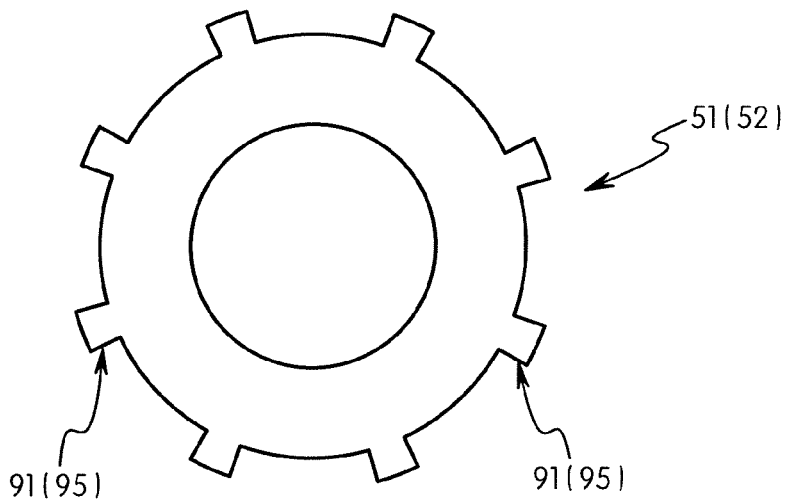
FIG. 15 is a bottom plan view of the first positioning member illustrated in FIG. 14 for the position control mechanism illustrated in FIGS. 3 to 7.
Figure 16:
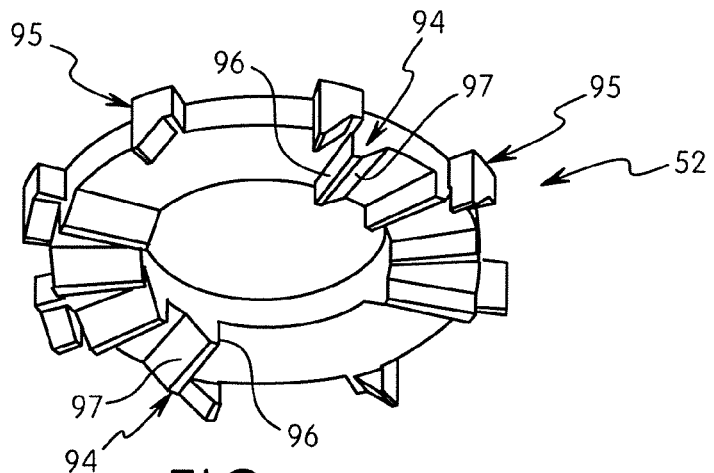
FIG. 16 is a perspective view of the second positioning member of the position control mechanism illustrated in FIGS. 2 to 6.

Referring now to FIGS. 11 to 13, the fixed member 50 basically includes an axle portion 75 and a flange portion 76. The fixed member 50 is preferably formed integrally as a one-piece unitary member. Moreover, the fixed member 50 is preferably constructed of a lightweight rigid material such as hard plastic or lightweight metal. Of course, it will be apparent from this disclosure that the fixed member 50 can be made of several pieces as needed and/or desired.

The axle portion 75 of the fixed member 50 extends along the rotational axis A between the lower and upper casings 36 and 38. The lower end of the axle portion 75 has four projections 77 that engage openings in the lower casing 36 to non-rotatably fix the lower end of the axle portion 75 to the lower casing 36. The upper end of the axle portion 75 has four projections 78 that engage openings in the upper casing 38 to non-rotatably fix the upper end of the axle portion 75 to the upper casing 38. A center hole 79 extends axially through the axle portion 75 for receiving the threaded fastener 40 therethrough.

The flange portion 76 of the fixed member 50 is provided on an outer circumference of the axle portion 75. The first and second positioning members 51 and 52 sandwich the flange portion 76 of the fixed member 50. In particular, the first and second positioning members 51 and 52 are biased towards the flange portion 76 of the fixed member 50 by the first and second biasing elements 55 and 56, respectively. The flange portion 76 of the fixed member 50 includes a first fixed structure 81 includes a plurality (two) of the first teeth 83 and a second fixed structure 82 includes a plurality (two) of the second teeth 84. The first and second teeth 83 and 84 protrude from opposite surfaces of the flange portion 76, respectively. Alternatively, the fixed member 50 can be configured to include only a single first tooth 83 and a single second tooth 84, as needed and/or desired.

The first teeth 83 of the fixed member 50 engage the first positioning member 51 to control the rotational movement of the first positioning member 51 with respect to the fixed member 50. Each of the first teeth 83 of the fixed member 50 includes a first abutment surface 85 and a first cam surface 86. The first cam surfaces 86 are oppositely facing surfaces from the first abutment surfaces 85 with respect to the rotational direction (i.e., the directions D1 and D2 of the illustrated embodiment) of the fixed member 50. The first abutment surfaces 85 function to limit rotational movement of the first positioning member 51 with respect to the fixed member 50. On the other hand, the first cam surfaces 86 function to selectively move the first positioning member 51 in the axial direction of the rotational axis A with respect to the fixed member 50 against the biasing force of the first biasing element 55.

The second teeth 84 of the fixed member 50 engage the second positioning member 52 to control the rotational movement of the second positioning member 52 with respect to the fixed member 50. Each of the second teeth 84 of the fixed member 50 includes a second abutment surface 87 and a second cam surface 88. The second cam surfaces 88 are oppositely facing surfaces from the second abutment surfaces 87 with respect to the rotational direction (i.e., the directions D1 and D2 of the illustrated embodiment) of the fixed member 50. The second abutment surfaces 87 function to limit rotational movement of the second positioning member 52 with respect to the fixed member 50. On the other hand, the second cam surfaces 88 function to selectively move the second positioning member 52 in the axial direction of the rotational axis A with respect to the fixed member 50 against the biasing force of the second biasing element 56.

Referring now to FIGS. 2, 3, 14 and 15, the first positioning member 51 is a ring shaped plate member. The first positioning member 51 is movably arranged relative to the second positioning member 52 in the first and second directions D1 and D2 during a shifting operation. The first positioning member 51 includes a plurality of first positioning teeth 90 and a plurality of first positioning cam portions 91. The first positioning teeth 90 are disposed on one axial face (upper surface) of the first positioning member 51. In the illustrated embodiment, the first positioning member 51 includes two sets of five of the first positioning teeth 90 for a total of ten of the first positioning teeth 90. The first positioning cam portions 91 are disposed on an outer peripheral edge of the first positioning member 51. In the illustrated embodiment, the first positioning member 51 includes eight of the first positioning cam portions 91. The first positioning member 51 is preferably formed integrally as a one-piece unitary member. Moreover, the first positioning member 51 is preferably constructed of a lightweight rigid material such as hard plastic or lightweight metal. Of course, it will be apparent from this disclosure that the first positioning member 51 can be made of several pieces as needed and/or desired.

The first positioning teeth 90 selectively contact the first teeth 83 to prevent the first positioning member 51 from moving in the first direction D1. The first positioning member 51 selectively contacts the first teeth 83 (the fixed structure 81) to selectively index the first positioning member 51 relative to the fixed member 50. In particular, each of the first positioning teeth 90 of the first positioning member 51 includes a first corresponding abutment surface 92 and a first corresponding cam surface 93. The first corresponding abutment surfaces 92 selectively contact two of the first abutment surfaces 85 of the first teeth 83 to prevent the first positioning member 51 from moving in the first direction D1. The first corresponding cam surfaces 93 selectively slide on two of the first cam surfaces 86 of the first teeth 83.

In the case where the first corresponding abutment surfaces 92 of two of the first positioning teeth 90 abut the first abutment surfaces 85 of the first teeth 83, the first positioning member 51 prevents the second positioning member 52, the operating member 53 and the wire takeup member 54 from moving in the first operating direction D1. From this position, as the operating member 53 is moved in the first direction D1, the first operating cam portions 64 of the operating member 53 selectively move the first positioning cam portions 91 of the first positioning member 51. The first positioning member 51 is then moved by the first operating cam portion 64 relative to the flange portion 76 of the fixed member 50 in a transverse direction (i.e., axial direction of the illustrated embodiment) with respect to the first direction D1 against the biasing force of the first biasing element 55, which is toward the flange portion 76 of the fixed member 50.

Referring now to FIGS. 2, 3, 4 and 16, the second positioning member 52 is a ring shaped plate member. The second positioning member 52 is movably arranged relative to the first positioning member 51 in the first and second directions D1 and D2 during a shifting operation. The second positioning member 52 includes a plurality of second positioning teeth 94 and a plurality of second positioning cam portions 95. The second positioning teeth 94 are disposed on one axial face (lower surface) of the second positioning member 52. In the illustrated embodiment, the second positioning member 52 includes two sets of four of the second positioning teeth 94 for a total of eight of the second positioning teeth 94. The second positioning cam portions 95 are disposed on an outer peripheral edge of the second positioning member 52. In the illustrated embodiment, the second positioning member 52 includes eight of the second positioning cam portions 95. The second positioning member 52 is preferably formed integrally as a one-piece unitary member. Moreover, the second positioning member 52 is preferably constructed of a lightweight rigid material such as hard plastic or lightweight metal. Of course, it will be apparent from this disclosure that the second positioning member 52 can be made of several pieces as needed and/or desired.

The second positioning teeth 94 selectively contact the second teeth 84 (the second fixed structure 82) to prevent the second positioning member 52 from moving in the first direction D1. Also the second positioning member 52 selectively contacts the second teeth 84 (the second fixed structure 82) to selectively index the second positioning member 52 relative to the fixed member 50. In particular, each of the second positioning teeth 94 of the second positioning member 52 includes a second corresponding abutment surface 96 and a second corresponding cam surface 97. The second corresponding abutment surfaces 96 selectively contact the second abutment surfaces 87 of two of the second teeth 84 to prevent the second positioning member 52 from moving in the first direction D1. The second corresponding cam surfaces 97 selectively slide on the second cam surfaces 88 of two of the second teeth 84.

In the case where the second corresponding abutment surfaces 96 of two of the second positioning teeth 94 abut the second abutment surfaces 87 of the second teeth 84, the second positioning member 52 prevents the first positioning member 51, the operating member 53 and the wire takeup member 54 from moving in the first operating direction D1. From this position, as the operating member 53 is moved in the first direction D1 (e.g., a releasing operation), the second operating cam portions 66 of the operating member 53 selectively move the second positioning cam portions 95 of the second positioning member 52. The second positioning member 52 is then moved by the second operating cam portions 66 relative to the flange portion 76 of the fixed member 50 in a transverse direction (i.e., axial direction of the illustrated embodiment) with respect to the first direction D1 against the biasing force of the second biasing element 56, which is toward the flange portion 76 of the fixed member 50.

Turning now to FIGS. 17 to 20, the shifting operations of the position control mechanism 32 will be explained in more detail. The position control mechanism 32 is schematically illustrated in FIGS. 17 to 20. Thus, only one of the interactions between one of the first and second positioning teeth 90 and 94 and one of the first and second teeth 83 and 84, respectively, will be described and illustrated in FIGS. 17 to 20.

In FIGS. 17 to 20, the first biasing element 55 applies a first axial biasing force AF1 to the first positioning member 51, while the second biasing element 56 applies a second axial biasing force AF2 to the second positioning members 51 and 52. The first and second axial biasing forces AF1 and AF2 are equal or substantially equal in the illustrated embodiment. However, the first and second axial biasing forces AF1 can be unequal if needed and/or desired. Also in FIGS. 17 to 20, a rotational force RF is applied to the wire takeup member 54 by the spring 26a of the rear derailleur 26.

Figure 17:
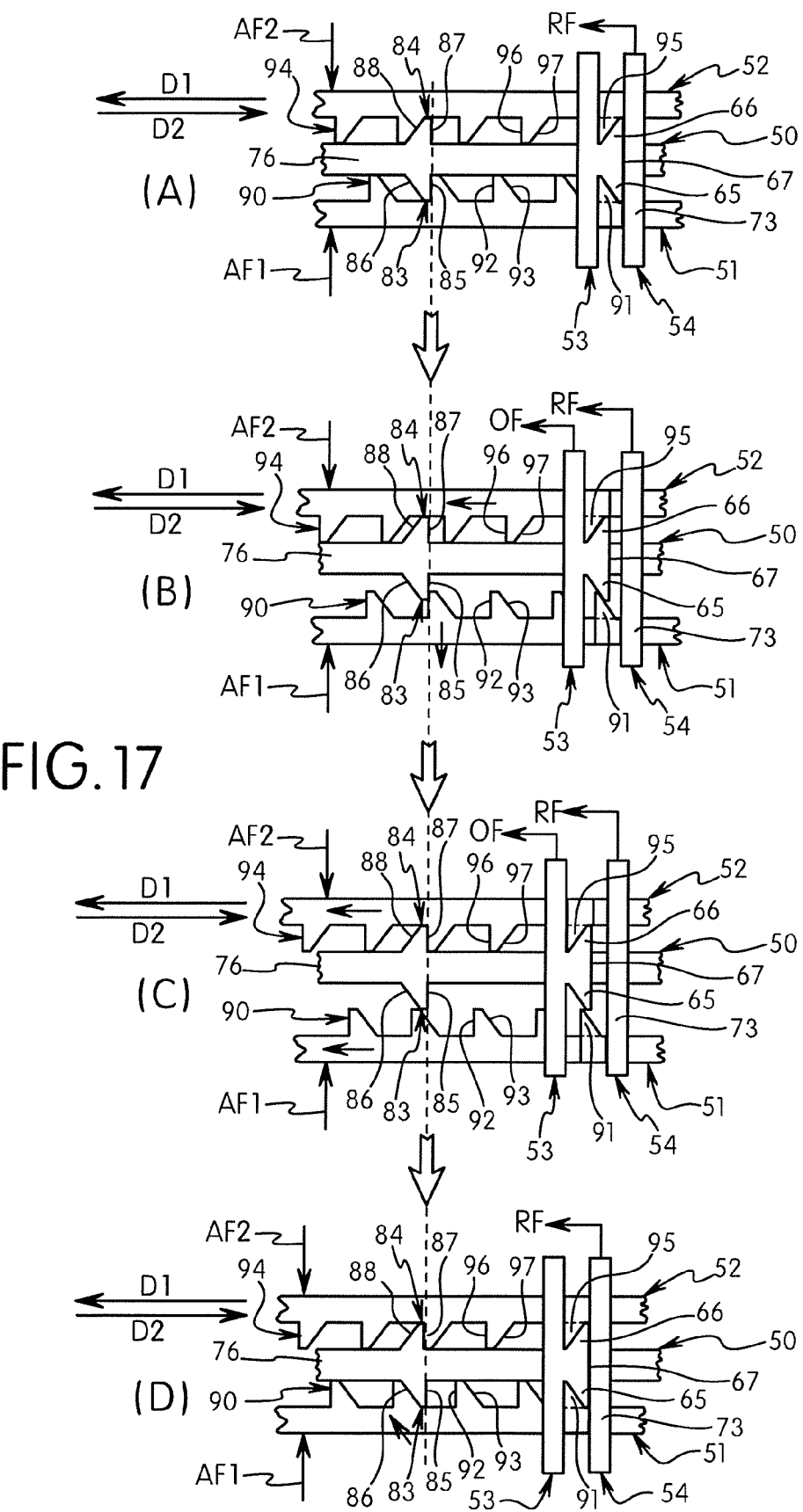
FIG. 17 is a series of schematic views of the position control mechanism, which illustrate a releasing operation to shift from a current shift position to a next shift position in which the first positioning tooth of the first positioning member is in contact with the first tooth of the fixed member to prevent the first and second positioning members from moving in the biasing direction.
Figure 18:
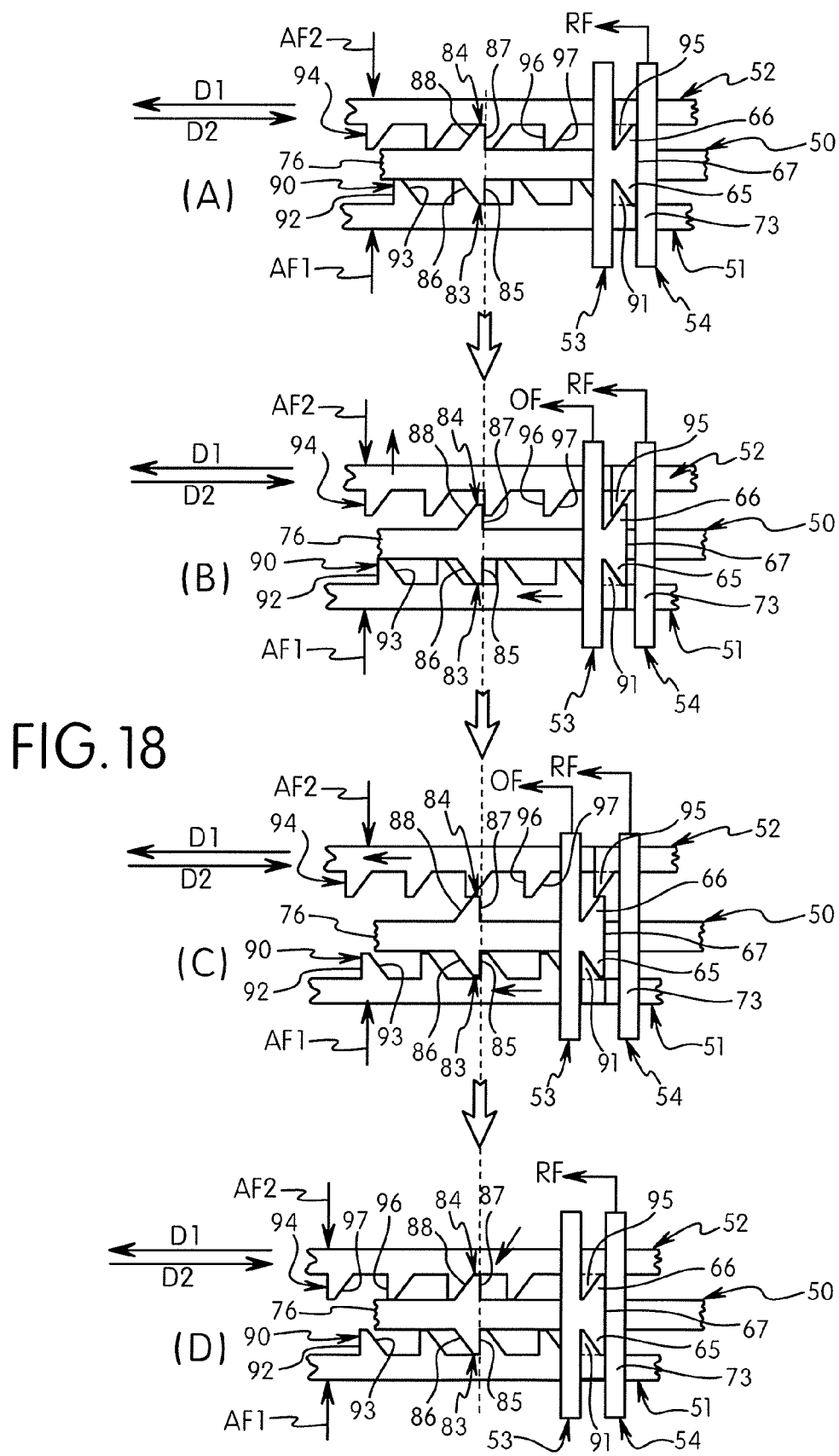
FIG. 18 is a series of schematic views of the position control mechanism, which illustrate a releasing operation to shift from a current shift position to a next shift position in which the second positioning tooth of the second positioning member is in contact with the second tooth of the fixed member to prevent the first and second positioning members from moving in the biasing direction.

As seen in FIGS. 17 and 18, an operating force OF is applied to the operating member 53 in the first direction D1 to perform a releasing operation for shifting from a current shift position to a next shift position. On the other hand, as seen in FIGS. 25 and 26, the operating force OF is applied to the operating member 53 in the second direction D2 to perform a pulling operation for shifting from a current shift position to a next shift position. Basically, as seen in FIGS. 17 and 18, the first and second positioning members 51 and 52 move relative to the fixed member 50 with the first and second positioning teeth 90 and 94 alternately contacting the first and second teeth 83 and 84 of the first and second fixed structures 81 and 82 as the operating member 53 is moved in the first direction D1 along the first movement path.

Referring to FIG. 17, in the initial state or rest position of view (A) of FIG. 17, the first corresponding abutment surface 92 of the first positioning tooth 90 of the first positioning member 51 abuts the first abutment surface 85 of the first tooth 83 of the fixed member 50 to prevent the first positioning member 51 from moving in the first operating direction D1. Likewise in this initial state or rest position, the second corresponding cam surface 97 of the second positioning tooth 94 of the second positioning member 52 abuts the second cam surface 88 of the second tooth 84 of the fixed member 50. Also in the initial state or rest position of view (A) of FIG. 17, the first positioning cam portion 91 of the first positioning member 51 contacts the axially extending spline 73 of the wire takeup member 54 to prevent movement of the wire takeup member 54 in the first direction D1 due to the biasing force applied to the wire takeup member 54 by the biasing element 26a of the rear derailleur 26 via the inner wire 28a. In addition, in this initial state or rest position, the second positioning cam portion 95 of the second positioning member 52 is engaged with the second operating cam portion 66 of the operating member 53. Finally, the axially extending spline 73 of the wire takeup member 54 is also biased against the contact surface 67 of the operating cam 64 of the operating member 53 due to the biasing force applied to the wire takeup member 54 by the biasing element 26a of the rear derailleur 26 via the inner wire 28a.

In the first intermediate position of view (B) of FIG. 17, the operating force OF is initially applied to the operating member 53 in the first direction D1. This operating force OF causes the operating member 53 to rotate in the first direction D1. This movement of the operating member 53 causes the first positioning cam portion 91 of the first positioning member 51 to slide on the first operating cam portion 65 of the operating member 53. Thus, the first positioning member 51 moves both in an axial direction and in an opposite direction of the first direction D1 (i.e., the biasing direction) relative to the second positioning member 52 and the operating member 53. Also this movement of the first positioning member 51 relative to the second positioning member 52 and the operating member 53 causes the wire takeup member 53 to separate from the contact surface 67 of the operating cam 64 of the operating member 53 and from the second positioning cam portion 95 of the second positioning member 52. However, the second positioning cam portion 95 of the second positioning member 52 remains in engaged with the second operating cam portion 66 of the operating member 53. In other words, the first positioning member 51 moves towards the opposite direction (i.e., the second direction D2) with respect to the second positioning member 52, while the second positioning member 52 moves together with the operating member 53.

Referring now to the second intermediate position of view (C) of FIG. 17 and the final position of view (D) of FIG. 17, the operating force OF is further applied to the operating member 53 in the first direction D1. Here, the first positioning tooth 90 of the first positioning member 51 passes over the first tooth 83 of the fixed member 50 such that the first corresponding abutment surface 92 no longer abuts the first abutment surface 85. In particular, once the first corresponding abutment surface 92 no longer abuts the first abutment surface 85, the biasing force on the wire takeup member 54 by the biasing element 26a now causes the first positioning member 51 and the wire takeup member 54 to move together in the first direction D1. However, the second abutment surface 87 of the second tooth 84 of the fixed member 50 now abuts against the second corresponding abutment surface 96 of the second positioning member 52. This contact between the second abutment surface 87 and the second corresponding abutment surface 96 prevents further movement of the second positioning member 52 relative to the fixed member 50 unless the operating member 53 is rotated further in the first operating direction D1. Also in the final position of view (D) of FIG. 17, the first corresponding cam surface 93 slide on the first cam surface 86 of the first tooth 83 to contact the flange portion 76 of the fixed member 50. The first positioning cam portion 91 of the first positioning member 51 also becomes fully engaged with the first operating cam portion 65 of the operating member 53. Once the first positioning cam portion 91 is fully engaged with the first operating cam portion 65, the wire takeup member 54 moves in the first direction D1 to the next shift position where the axially extending spline 73 of the wire takeup member 54 contacts the contact surface 67 of the operating cam 64 of the operating member 53.

Referring to FIG. 18, in the initial state or rest position of view (A) of FIG. 18, the second corresponding abutment surface 96 of the second positioning tooth 94 of the second positioning member 52 abuts the second abutment surface 87 of the second tooth 84 of the fixed member 50 to prevent the second positioning member 52 from moving in the first operating direction D1. Likewise in this initial state or rest position, the first corresponding cam surface 93 of the first positioning tooth 90 of the first positioning member 51 abuts the first cam surface 86 of the first tooth 83 of the fixed member 50. Also in the initial state or rest position of view (A) of FIG. 17, the second positioning cam portion 95 of the second positioning member 52 contacts the axially extending spline 73 of the wire takeup member 54 to prevent movement of the wire takeup member 54 due to the biasing force applied to the wire takeup member 54 by the biasing element 26a of the rear derailleur 26 via the inner wire 28a. In addition, in this initial state or rest position, the first positioning cam portion 91 of the first positioning member 51 is engaged with the first operating cam portion 65 of the operating member 53. Finally, the axially extending spline 73 of the wire takeup member 54 is also biased against the contact surface 67 of the operating cam 64 of the operating member 53 due to the biasing force applied to the wire takeup member 54 by the biasing element 26a of the rear derailleur 26 via the inner wire 28a.

In the first intermediate position of view (B) of FIG. 18, the operating force OF is initially applied to the operating member 53 in the first direction D1. This operating force OF causes the operating member 53 to rotate in the first direction D1. This movement of the operating member 53 causes the second positioning cam portion 95 of the second positioning member 52 to slide on the second operating cam portion 66 of the operating member 53. Thus, the second positioning member 52 moves both in an axial direction and in an opposite direction of the first direction D1 (i.e., the biasing direction) relative to the first positioning member 51 and the operating member 53. Also this movement of the second positioning member 52 relative to the first positioning member 51 and the operating member 53 causes the wire takeup member 53 to separate from the contact surface 67 of the operating cam 64 of the operating member 53 and from the first positioning cam portion 91 of the first positioning member 51. However, the first positioning cam portion 91 of the first positioning member 51 remains in engaged with the first operating cam portion 65 of the operating member 53. In other words, the second positioning member 52 moves towards the opposite direction (i.e., the second direction D2) with respect to the first positioning member 51, while the first positioning member 51 moves together with the operating member 53.

Referring now to the second intermediate position of view (C) of FIG. 18 and the final position of view (D) of FIG. 18, the operating force OF is further applied to the operating member 53 in the first direction D1. Here, the second positioning tooth 94 of the second positioning member 52 passes over the second tooth 84 of the fixed member 50 such that the second corresponding abutment surface 97 no longer abuts the second abutment surface 87. In particular, once the second corresponding abutment surface 97 no longer abuts the second abutment surface 87, the biasing force on the wire takeup member 54 by the biasing element 26a now causes the second positioning member 52 and the wire takeup member 54 to move together in the first direction D1. However, the first abutment surface 85 of the first tooth 83 of the fixed member 50 now abuts against the first corresponding abutment surface 92 of the first positioning member 51. This contact between the first abutment surface 85 and the first corresponding abutment surface 92 prevents further movement of the first positioning member 51 relative to the fixed member 50 unless the operating member 53 is rotated further in the first operating direction D1. Also in the final position of view (D) of FIG. 18, the second corresponding cam surface 97 slides on the second cam surface 88 of the second tooth 84 to contact the flange portion 76 of the fixed member 50. The second positioning cam portion 95 of the second positioning member 52 also becomes fully engaged with the second operating cam portion 66 of the operating member 53. Once the second positioning cam portion 95 is fully engaged with the second operating cam portion 66, the wire takeup member 54 moves in the first direction D1 to the next shift position where the axially extending spline 73 of the wire takeup member 54 contacts the contact surface 67 of the operating cam 64 of the operating member 53.

Figure 19:
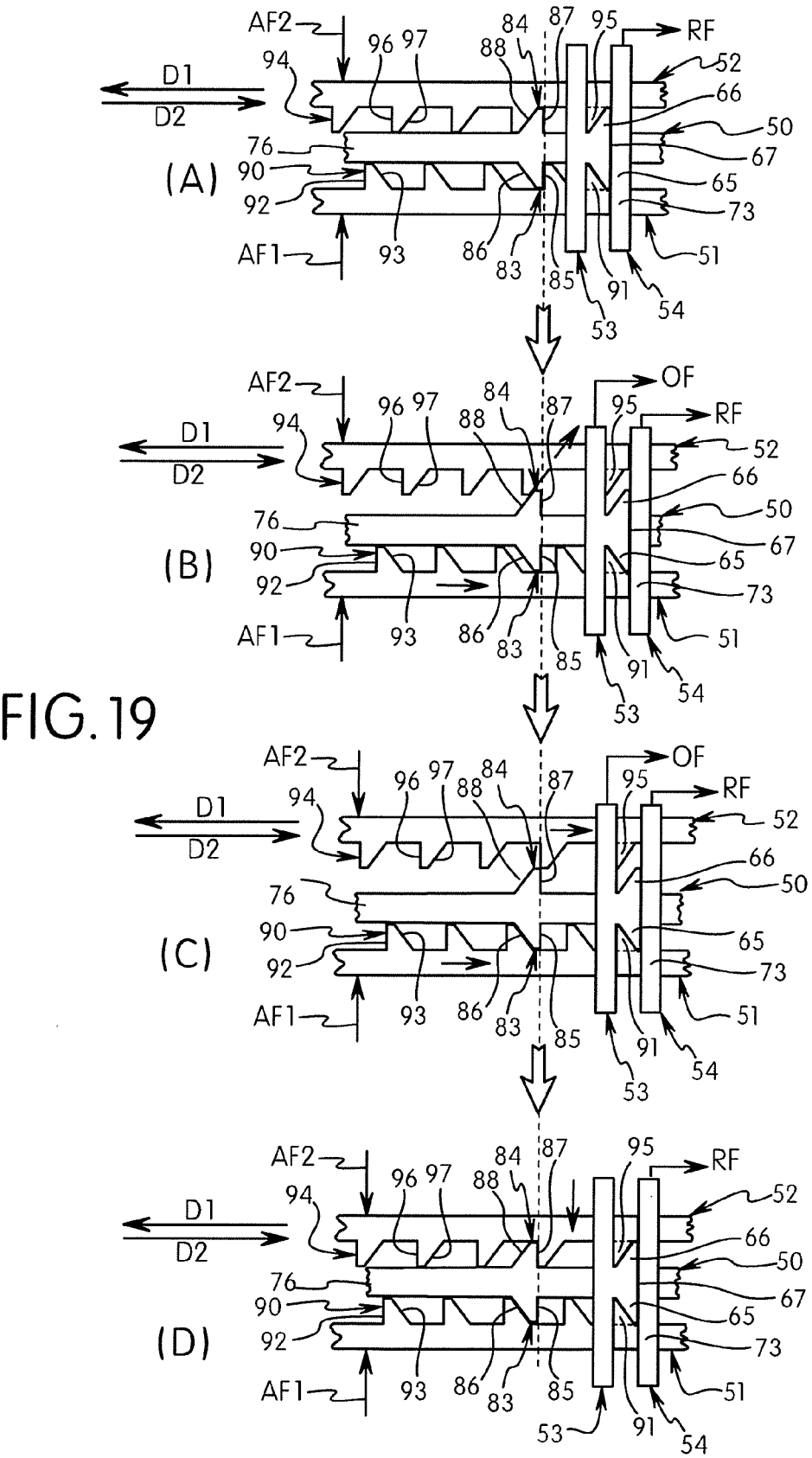
FIG. 19 is a series of schematic views of the position control mechanism, which illustrate a pulling operation to shift from a current shift position to a next shift position in which the first positioning tooth of the first positioning member is in contact with the first tooth of the fixed member to prevent the first and second positioning members from moving in the biasing direction.

Referring to FIG. 19, in the initial state or rest position of view (A) of FIG. 19, the first corresponding abutment surface 92 of the first positioning tooth 90 of the first positioning member 51 abuts the first abutment surface 85 of the first tooth 83 of the fixed member 50 to prevent the first positioning member 51 from moving in the first operating direction D1. Likewise in this initial state or rest position, the second corresponding cam surface 97 of the second positioning tooth 94 of the second positioning member 52 abuts the second cam surface 88 of the second tooth 84 of the fixed member 50. Also in the initial state or rest position of view (A) of FIG. 17, the first positioning cam portion 91 of the first positioning member 51 contacts the axially extending spline 73 of the wire takeup member 54 to prevent movement of the wire takeup member 54 due to the biasing force applied to the wire takeup member 54 by the biasing element 26a of the rear derailleur 26 via the inner wire 28a. In addition, in this initial state or rest position, the second positioning cam portion 95 of the second positioning member 52 is engaged with the second operating cam portion 66 of the operating member 53. Finally, the axially extending spline 73 of the wire takeup member 54 is also biased against the contact surface 67 of the operating cam 64 of the operating member 53 due to the biasing force applied to the wire takeup member 54 by the biasing element 26a of the rear derailleur 26 via the inner wire 28a.

In the first intermediate position of view (B) of FIG. 19, the operating force OF is initially applied to the operating member 53 in the second direction D2. This operating force OF causes the operating member 53 to rotate in the second direction D2. Here, the second corresponding cam surface 97 of the second positioning tooth 94 of the second positioning member 52 slides on the second cam surface 88 of the second tooth 84 of the fixed member 50 away from the flange portion 76 of the fixed member 50. Thus, the second positioning member 52 moves both in an axial direction and in the second direction D1 (i.e., opposite the biasing direction) relative to the first positioning member 51. This movement of the operating member 53 in the second direction D2 further causes the first positioning member 51 and the wire takeup member 54 to move with the operating member 53.

Referring now to the second intermediate position of view (C) of FIG. 19 and the final position of view (D) of FIG. 19, the operating force OF is further applied to the operating member 53 in the second direction D2. Here, the second positioning tooth 94 of the second positioning member 52 passes over the second tooth 84 of the fixed member 50 such that the second corresponding abutment surface 96 abuts the second abutment surface 87. This contact between the second abutment surface 87 and the second corresponding abutment surface 96 prevents further movement of the second positioning member 52 relative to the fixed member 50 unless the operating member 53 is rotated further in the first operating direction D2.

Figure 20:
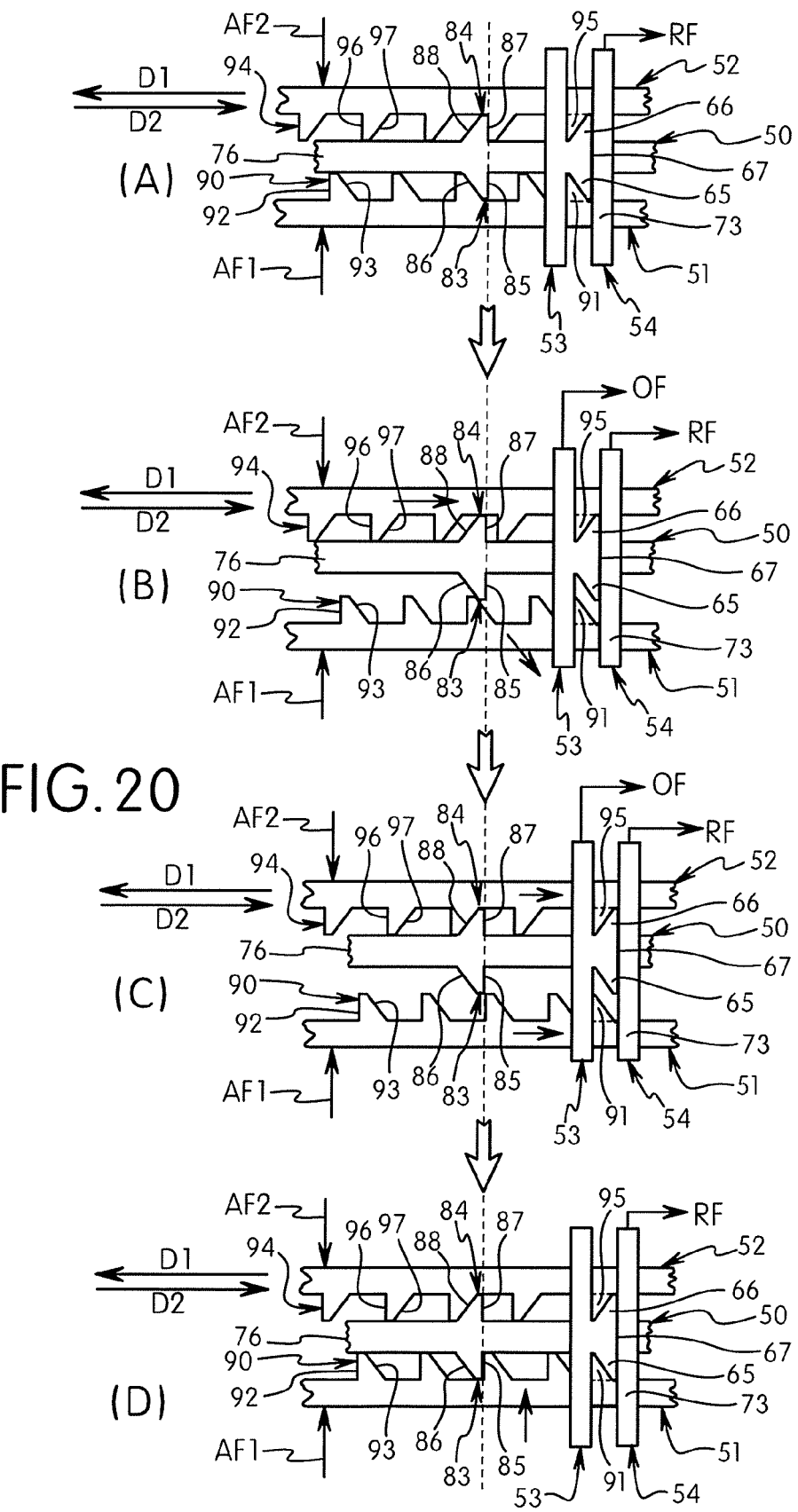
FIG. 20 is a series of schematic views of the position control mechanism, which illustrate a pulling operation to shift from a current shift position to a next shift position in which the second positioning tooth of the second positioning member is in contact with the second tooth of the fixed member to prevent the first and second positioning members from moving in the biasing direction.

Referring to FIG. 20, in the initial state or rest position of view (A) of FIG. 20, the second corresponding abutment surface 96 of the second positioning tooth 94 of the second positioning member 52 abuts the second abutment surface 87 of the second tooth 84 of the fixed member 50 to prevent the second positioning member 52 from moving in the first operating direction D1. Likewise in this initial state or rest position, the first corresponding cam surface 93 of the first positioning tooth 90 of the first positioning member 51 abuts the first cam surface 86 of the first tooth 83 of the fixed member 50. Also in the initial state or rest position of view (A) of FIG. 20, the second positioning cam portion 95 of the second positioning member 52 contacts the axially extending spline 73 of the wire takeup member 54 to prevent movement of the wire takeup member 54 due to the biasing force applied to the wire takeup member 54 by the biasing element 26a of the rear derailleur 26 via the inner wire 28a. In addition, in this initial state or rest position, the first positioning cam portion 91 of the first positioning member 51 is engaged with the first operating cam portion 65 of the operating member 53. Finally, the axially extending spline 73 of the wire takeup member 54 is also biased against the contact surface 67 of the operating cam 64 of the operating member 53 due to the biasing force applied to the wire takeup member 54 by the biasing element 26a of the rear derailleur 26 via the inner wire 28a.

In the first intermediate position of view (B) of FIG. 20, the operating force OF is initially applied to the operating member 53 in the second direction D2. This operating force OF causes the operating member 53 to rotate in the second direction D2. Here, the first corresponding cam surface 93 of the first positioning tooth 90 of the first positioning member 51 slides on the first cam surface 86 of the first tooth 83 of the fixed member 50 away from the flange portion 76 of the fixed member 50. Thus, the first positioning member 51 moves both in an axial direction and in the second direction D1 (i.e., opposite the biasing direction) relative to the second positioning member 52. This movement of the operating member 53 in the second direction D2 further causes the second positioning member 52 and the wire takeup member 54 to move with the operating member 53.

Referring now to the second intermediate position of view (C) of FIG. 20 and the final position of view (D) of FIG. 20, the operating force OF is further applied to the operating member 53 in the second direction D2. Here, the first positioning tooth 90 of the first positioning member 51 passes over the first tooth 83 of the fixed member 50 such that the first corresponding abutment surface 92 abuts the first abutment surface 85. This contact between the first abutment surface 85 and the first corresponding abutment surface 92 prevents further movement of the first positioning member 51 relative to the fixed member 50 unless the operating member 53 is rotated further in the first operating direction D2.

Figure 21:
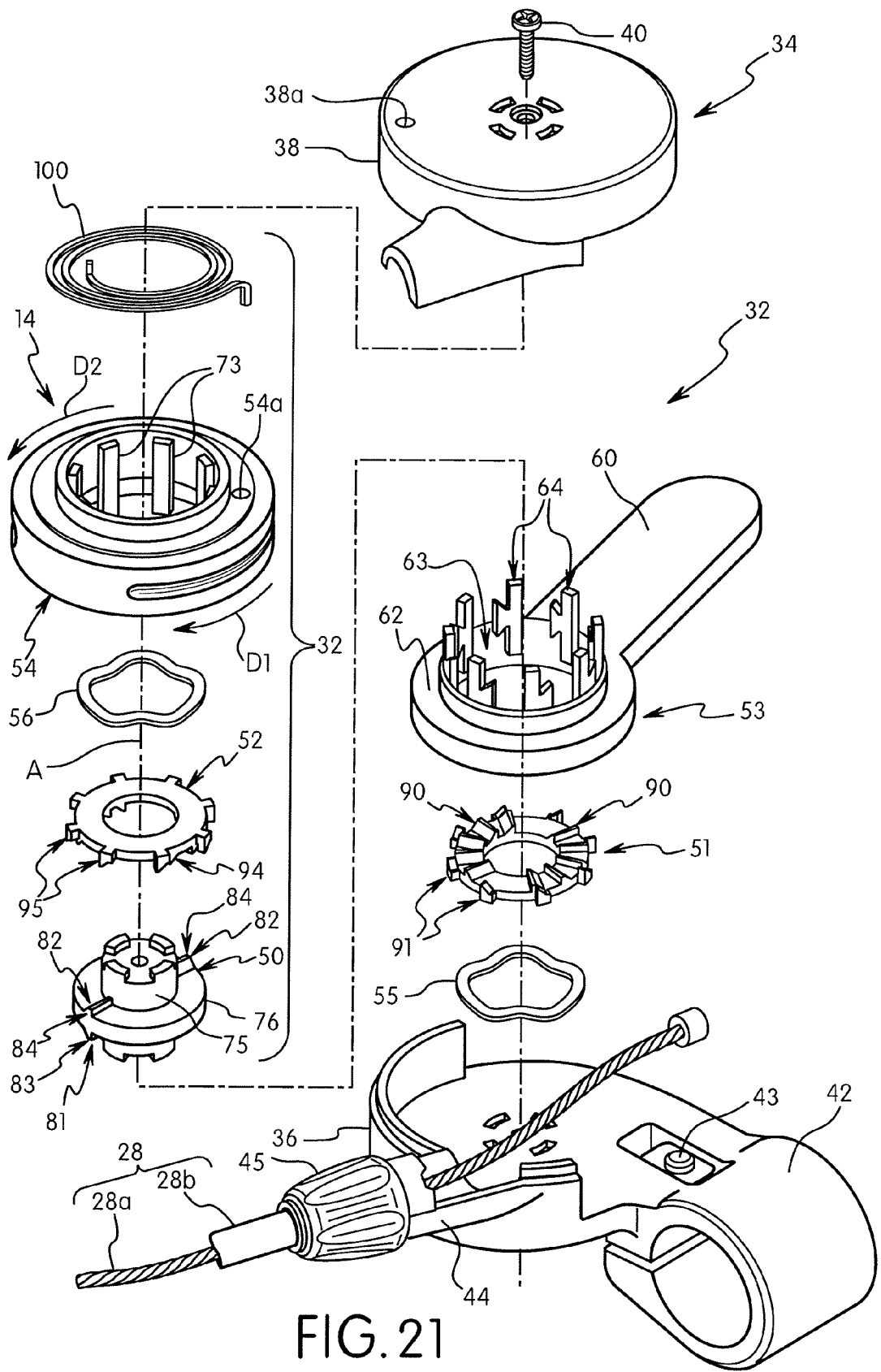
FIG. 21 is an exploded perspective view, similar to FIG. 2, of the right side shift control device in which a torsion spring has been added between the upper casing of the housing and the wire takeup member.

Referring now to FIG. 21, the position control mechanism 32 of the right side shift control device 14 has been modified to include a biasing element 100. The biasing element 100 is operatively disposed between the upper casing 38 of the housing 34 and the wire takeup member 54. The biasing element 100 biases the wire takeup member 54 in the first direction D1. In this embodiment, the biasing element 100 is a torsion spring that has one end disposed in a hole 38a in the upper casing 38 of the housing 34 and the other end disposed in a hole 54a in the wire takeup member 54. Other than the addition of the biasing element 100, the hole 38a in the upper casing 38 of the housing 34 and the hole 54a in the wire takeup member 54, the position control mechanism 32 of the right side shift control device 14 is the same as discussed above.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them unless otherwise stated. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A position control mechanism for a bicycle control device, the position control mechanism comprising:
    a casing;
    a fixed member including a first tooth and a second tooth, the fixed member being non-rotatable relative to the casing;
    a first positioning member including a first positioning tooth selectively contacting the first tooth to prevent the first positioning member from moving in a first direction;
    a second positioning member including a second positioning tooth selectively contacting the second tooth to prevent the second positioning member from moving in the first direction, the second positioning member being movably arranged relative to the first positioning member; and
    an operating member movably arranged relative to the fixed member to move in the first direction, the operating member being operatively arranged relative to the first and second positioning members such that the first and second positioning members move relative to the fixed member and the first and second positioning teeth contact the first and second teeth alternately as the operating member is moved in the first direction,
    the operating member and the first and second positioning members rotating in the first direction relative to the fixed member around a rotational axis,
    the fixed member includes an axle portion extending along the rotational axis and a flange portion provided on an outer circumference of the axle portion, the first and second teeth protruding from opposite surfaces of the flange portion, respectively,
    the first and second positioning members sandwiching the flange portion of the fixed member, and the first and second positioning members being biased towards the flange portion of the fixed member, respectively, and
    the operating member including a first operating cam portion that selectively contacts a first positioning cam portion of the first positioning member to move the first positioning member relative to the flange portion of the fixed member in a transverse direction with respect to the first direction against biasing force toward the flange portion of the fixed member as the operating member is moved in the first direction.

2. The position control mechanism according to claim 1, further comprising
    a wire takeup member movably arranged relative to the fixed member to move in the first direction in response to movement the operating member in the first direction.

3. The position control mechanism according to claim 2, wherein
    the wire takeup member is biased toward the first direction.

4. The position control mechanism according to claim 1, wherein
    the operating member includes an operating cam portion that selectively contacts a positioning cam portion of the second positioning member to move the second positioning member relative to the flange portion of the fixed member in a transverse direction with respect to the first direction against biasing force toward the flange portion of the fixed member as the operating member is moved in the first direction.

5. The position control mechanism according to claim 1, wherein
    the first tooth of the fixed member includes a first abutment surface, and
    the first positioning tooth of the first positioning member includes a first corresponding abutment surface that selectively contacts the first abutment surface of the first tooth to prevent the first positioning member from moving in the first direction.

6. The position control mechanism according to claim 5, wherein
    the first tooth of the fixed member further includes a first cam surface as an opposite facing surface of the first abutment surface, and
    the first positioning tooth of the first positioning member further includes a first corresponding cam surface that selectively slides on the first cam surface of the first tooth.

7. The position control mechanism according to claim 1, wherein
    the second tooth of the fixed member includes an abutment surface, and
    the second positioning tooth of the second positioning member includes a corresponding abutment surface that selectively contacts the abutment surface to prevent the second positioning member from moving in the first direction.

8. The position control mechanism according to claim 7, wherein
the second tooth of the fixed member further includes a cam surface as an opposite facing surface of the abutment surface,
the second positioning tooth of the second positioning member further includes a corresponding cam surface that selectively slides on the cam surface of the second tooth.

9. The position control mechanism according to claim 1, wherein
the fixed member includes a plurality of the first and second teeth, and
the first and second positioning members includes a plurality of the first and second positioning teeth, respectively.

10. The position control mechanism according to claim 1, wherein
the first and second positioning members are disposed on opposite axial sides of the fixed member relative to a rotational axis of the operating member.

11. The position control mechanism according to claim 1, wherein
the first positioning tooth extends from the first positioning member in a first axial direction and the second positioning tooth extends from the second positioning member in a second axial direction which is opposite the first axial direction relative to a rotational axis of the operating member.

12. The position control mechanism according to claim 1, wherein
the first positioning member, the second positioning member, and the operating member are all separate elements.

13. The position control mechanism according to claim 1, wherein
the first and second positioning members are axially spaced from each other relative to a rotational axis of the operating member.

14. A position control mechanism for a bicycle control device, the position control mechanism comprising:
a casing;
a fixed member including a first fixed structure and a second fixed structure, the fixed member and the first and second fixed structures being non-rotatable relative to the casing;
a first positioning member selectively contacting the first fixed structure to selectively index the first positioning member relative to the fixed member;
a second positioning member selectively contacting the second fixed structure to selectively index the second positioning member relative to the fixed member; and
an operating member movably arranged relative to the fixed member to move along a first movement path, the operating member being further operatively arranged relative to the first and second positioning members such that the first and second positioning members contact the first and second fixed structures alternately as the operating member is moved in a first direction along the first movement path, and such that each of the first and second positioning members moves relative to the fixed member to a next relative position along the first movement path as the operating member is moved along the first movement path, and such that at least one of the first and second positioning members moves relative to the fixed member along a second movement path as the operating member is moved along the first movement path, the second movement path being transverse to the first movement path,
the operating member and the first and second positioning members rotating in the first direction relative to the fixed member around a rotational axis,
the fixed member includes an axle portion extending along the rotational axis and a flange portion provided on an outer circumference of the axle portion, the first and second fixed structures protruding from opposite surfaces of the flange portion, respectively,
the first and second positioning members sandwiching the flange portion of the fixed member, and the first and second positioning members being biased towards the flange portion of the fixed member, respectively, and
the operating member including a first operating cam portion that selectively contacts a first positioning cam portion of the first positioning member to move the first positioning member relative to the flange portion of the fixed member in a transverse direction with respect to the first direction against biasing force toward the flange portion of the fixed member as the operating member is moved in the first direction.

* * * * *